United States Patent [19]

Hellwig et al.

[11] 4,354,251

[45] Oct. 12, 1982

[54] DEVICE FOR TESTING PROGRAMS FOR NUMERICAL CONTROL OF MACHINE TOOLS

[75] Inventors: Friedrich-Wilhelm Hellwig, Hemhofen; Christian Seeliger, Grossenbach, both of Fed. Rep. of Germany

[73] Assignee: Siemens Aktiengesellschaft, Munich, Fed. Rep. of Germany

[21] Appl. No.: 127,574

[22] Filed: Mar. 6, 1980

[30] Foreign Application Priority Data

Apr. 6, 1979 [DE] Fed. Rep. of Germany ....... 2913999

[51] Int. Cl.³ .................... G06F 11/16; G06F 11/32; G06F 3/14
[52] U.S. Cl. .................................. 364/900; 371/21; 371/53
[58] Field of Search .......................... 371/21, 50, 53; 364/200 MS File, 900 MS File

[56] References Cited

U.S. PATENT DOCUMENTS

| 3,519,988 | 7/1970 | Grossman | 371/21 |
| 3,831,144 | 8/1974 | En | 371/50 |
| 3,838,264 | 9/1974 | Maker | 371/21 |
| 4,118,789 | 10/1978 | Casto et al. | 364/900 |

*Primary Examiner*—Harvey E. Springborn
*Attorney, Agent, or Firm*—Kenyon and Kenyon

[57] ABSTRACT

In numerical controls of machine tools, the downwards (lengthwise) sum of the programmed information of each system program memory (SP1) is stored in an additional memory. For later checking of the memory contents, the downwards sums of the respective memories on the control side are formed and are compared with the stored information. If a sum deviates, a trouble signal is given out as an indication of the defective memory.

3 Claims, 3 Drawing Figures

DEVICE FOR TESTING PROGRAMS FOR NUMERICAL CONTROL OF MACHINE TOOLS

BACKGROUND OF THE INVENTION

This invention relates to a device for testing programs for numerical control of machine tools. More particularly, the invention relates to testing system programs for the internal control of command execution which are permanently programmed in semiconductor memories.

In present day automation systems for use in the control of machine tools, mocroprocessors have largely displaced the former hard-wired logic (see, for instance, Siemens-Zeitschrift 1977, No. 8). The logic cycles executed by the system, e.g., the system program, are usually permanently stored in semiconductor memories. One bit, the smallest unit of information, missing from such a memory can lead to faulty operation of the entire control system. In such a case it is relatively difficult to localize the defective storage device.

It is an object of the present invention to describe a simple and operationally reliable device for checking the system program.

SUMMARY OF THE INVENTION

According to the present invention, this problem is solved by providing an additional semiconductor memory in which, for each memory, the downward (lengthwise) sum of its programmed information is stored. The downward sum of the information in a storage device on the control side is compared with the related downward sum stored in the additional memory, and a signal is generated in the event of a deviation or difference.

The above mentioned check can be made either each time the system is switched on or cyclically and automatically at given time intervals, provided that enough time is available for this purpose on the control side. In either case, the result of the test can be indicated, for instance, on a display unit, identifying which storage device is defective.

DETAILED DESCRIPTION OF THE INVENTION

Figure 1:
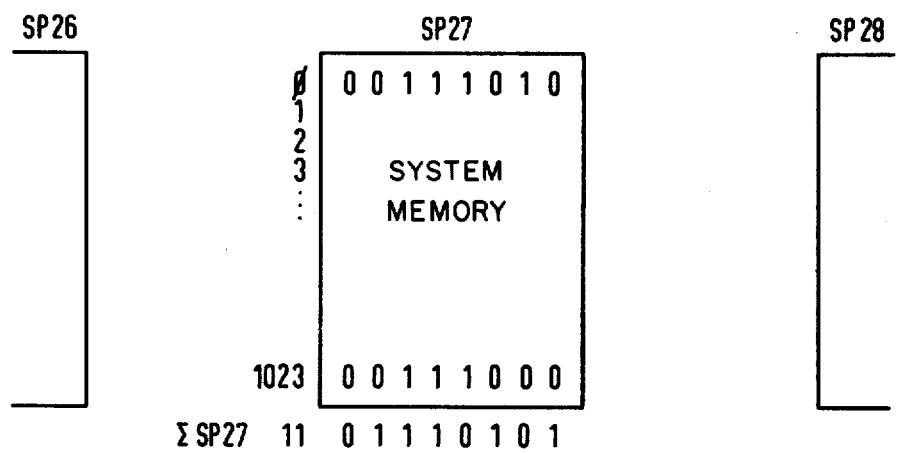
FIG. 1 shows the manner in which the information is stored in a system program memory.

FIG. 1 shows a memory SP 27, one of the memories of the numerical control containing the system program, in detail. It has an 8-bit word length and 1024 addresses. Addition of all the words stored in SP 27 results in a new bit pattern, the downwards (lengthwise) sum $\Sigma$SP 27, as shown at the bottom end of the memory. The storage of the carry 11 which exceeds the word length of 8 bits can be dispensed with.

Figure 2:
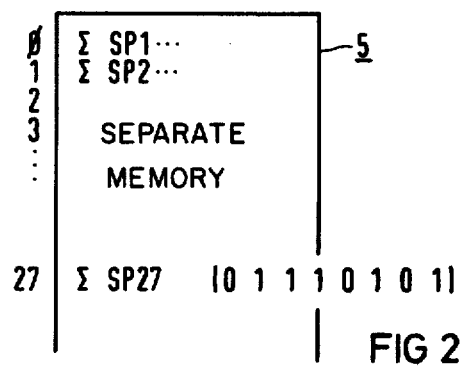
FIG. 2 shows the manner of storage of the downward sums of the different storage devices of a system program as they are stored in a separate memory.

FIG. 2 shows how the lengthwise sums $\Sigma$SP1, $\Sigma$SP2, etc. for each of the individual memories of the system program are stored in a separate memory 5. It will be seen that the sum SP$\Sigma$27 (shown at the bottom of FIG. 1) is stored under the address of memory 27.

In operation, when the system is switched on, a summing process is started. In this process, the downwards sum of each memory is determined. The downwards total for each memory is compared with the related, predetermined total in separate memory 5 (FIG. 2). In the event of a difference, the number of the defective storage device is indicated and the system is shut down. As already mentioned above, the process can be cyclical or carried out only upon starting up.

Figure 3:
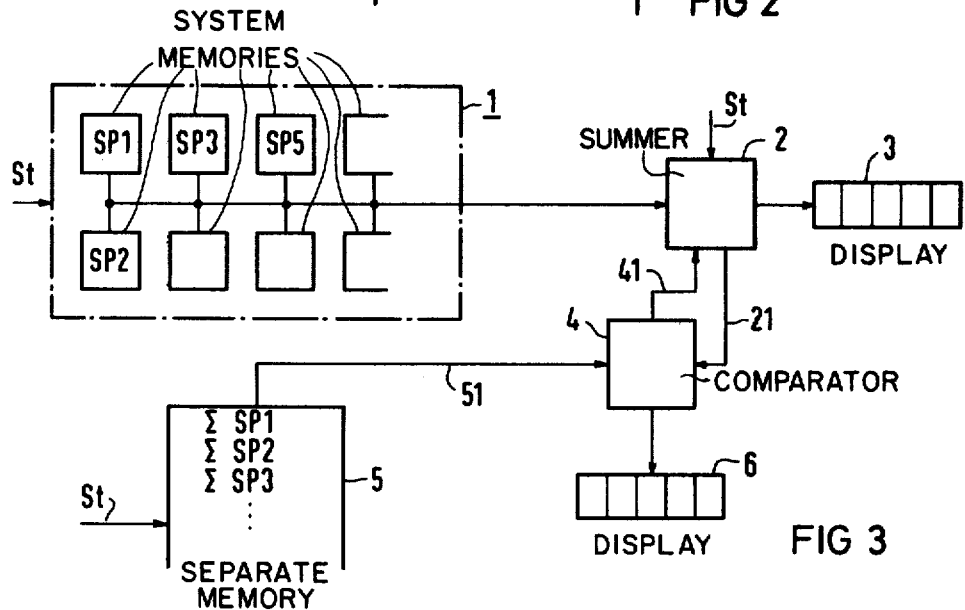
FIG. 3 is a circuit arrangement for implementing the check.

A circuit for performing the check is shown detail in FIG. 3. There, in area 1 (framed by dash-dotted lines), the individual memories in which the system program is stored are indicated by SP1, SP2 etc. Upon a start command St, one word after another of the memory SP1 is first called up and added in a summer 2 to the appropriate preceding one. The result of the addition is fed, via a connecting line 21, to a comparator 4. At the same time, the downwards sum for memory SP1, stored in permanent memory 5, is simultaneously fed via a connecting line 51 to comparator 4. If comparator 4 ascertains that the two sums agree, summing device 2 is cleared by means of an signal on line 41 and is then connected to memory SP2. The words of memory SP2 are then added up in the same way and compared with the downwards sum of this memory SP2 previously stored in memory 5. If an inequality is obtained in this continuing comparison of the actual value of downward sums with the associated predetermined value of the downwards sum, the number of the defective storage device is made visible on the display 6.

According to a further embodiment of the invention, it is advantageous to expand the circuit so that, in a special mode of operation, the system indicates the bit sums of each memory on a display 3. This is of advantage for the development engineer, since he must deposit the downwards sum of each memory in the separate memory and it must therefore be known to him. When this is being done, memory after memory is interrogated manually. In automatic checking, all control processes, of course, run automatically.

What is claimed is:

1. A device for testing the system program of a numerical control in a machine tool, said system program being for the internal control of the command cycle and being permanently stored in a plurality of system semiconductor memories, comprising: an additional semiconductor memory in which a word sum of the information permanently stored in each of said system semiconductor memories is individually stored for each system semiconductor memory; means for taking new word sums of each system semiconductor memory; means for comparing each new word sum with the corresponding sum stored in the said additional memory; and display means for indicating which memory is defective, in the event there is a difference between said new sum and the corresponding stored sum in said additional memory.

2. A device in accordance with claim 1, further comprising:

the semiconductor memories being connected, via a summing device, to the comparator and the additional memory being connected to the comparator.

3. A device in accordance with claim 2, further comprising a display connected to the summing device.

* * * * *